United States Patent
Lee et al.

(10) Patent No.: US 9,973,131 B2
(45) Date of Patent: May 15, 2018

(54) MOTOR DRIVING DEVICE AND LAUNDRY TREATMENT APPARATUS INCLUDING THE SAME

(71) Applicant: LG ELECTRONICS INC., Seoul (KR)

(72) Inventors: Junho Lee, Seoul (KR); Chungill Lee, Seoul (KR); Jungmoon Je, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 13 days.

(21) Appl. No.: 15/013,817

(22) Filed: Feb. 2, 2016

(65) Prior Publication Data
US 2016/0226426 A1    Aug. 4, 2016

(30) Foreign Application Priority Data
Feb. 2, 2015 (KR) .......................... 10-2015-0016101

(51) Int. Cl.
*H02P 27/06* (2006.01)
*H02P 27/08* (2006.01)
(Continued)

(52) U.S. Cl.
CPC ............ *H02P 27/06* (2013.01); *D06F 37/304* (2013.01); *H02P 6/14* (2013.01); *H02P 6/28* (2016.02); *H02P 21/18* (2016.02); *H02P 27/085* (2013.01)

(58) Field of Classification Search
CPC combination set(s) only.
See application file for complete search history.

(56) References Cited

U.S. PATENT DOCUMENTS 5,592,058 A * 1/1997 Archer ................. F24F 11/0009
                                                     318/400.08
2013/0063058 A1* 3/2013 Shouji ............... H02M 7/53875
                                                    318/400.06
(Continued)

FOREIGN PATENT DOCUMENTS

CN         102893510         1/2013
CN         103789962         5/2014
(Continued)

OTHER PUBLICATIONS

European Search Report dated Jun. 9, 2016 issued in Application No. 16153350.0.
(Continued)

*Primary Examiner* — Jason Ko
*Assistant Examiner* — Cristi Tate-Sims
(74) *Attorney, Agent, or Firm* — KED & Associates LLP

(57) ABSTRACT

The present disclosure relates to a motor driving device and a laundry treatment apparatus. The motor driving device may include an inverter to convert DC power into AC power according to a switching operation and to output the converted AC power to a motor, an output current detector to detect an output current flowing through the motor, and a controller to control the inverter based on the detected output current. The controller changes a carrier frequency, changes a voltage command based on the changed carrier frequency and outputs an inverter switching control signal to the inverter based on the changed carrier frequency and the changed voltage command. Accordingly, noise may be reduced during operation of the motor.

17 Claims, 12 Drawing Sheets

(51) Int. Cl.
*H02P 6/28* (2016.01)
*H02P 21/18* (2016.01)
*D06F 37/30* (2006.01)
*H02P 6/14* (2016.01)

(56) References Cited

U.S. PATENT DOCUMENTS

2014/0239861 A1* 8/2014 Ajima .................. H02P 27/085
  318/400.17
2014/0375240 A1  12/2014 Kawashima et al.

FOREIGN PATENT DOCUMENTS

| | | | |
|---|---|---|---|
| CN | 104022703 | 9/2014 | |
| EP | 2 728 051 | 5/2014 | |
| EP | 2 809 001 | 12/2014 | |
| EP | 2809001 A2 * | 12/2014 | ............ H02P 27/085 |
| JP | H 11-252976 | 9/1999 | |
| JP | 2004-329604 | 11/2004 | |
| JP | 4406180 | 1/2010 | |
| KR | 10-2010-0102965 | 9/2010 | |
| KR | 10-2010-0105200 | 9/2010 | |
| KR | 10-1397763 | 5/2014 | |
| WO | WO 2014/192373 | 12/2014 | |
| WO | WO 2014192373 A1 * | 12/2014 | .......... H02M 7/5395 |

OTHER PUBLICATIONS

Korean Office Action dated Oct. 26, 2016 issued in Application No. 10-2015-0016101.
Chinese Office Action dated Dec. 22, 2017 issued in Application No. 201610069579.6 (with English Translation).

* cited by examiner

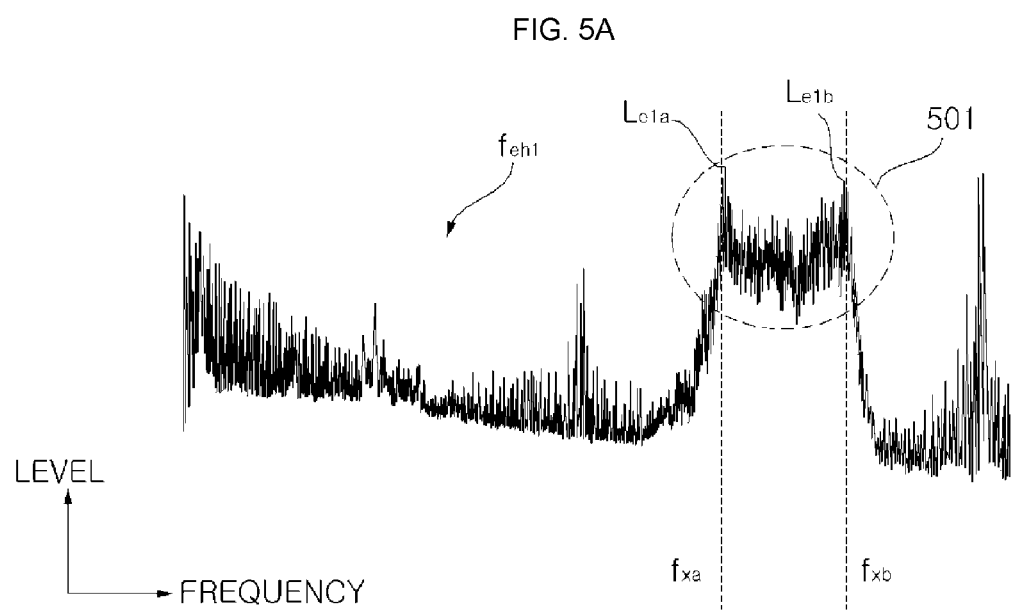

MOTOR DRIVING DEVICE AND LAUNDRY TREATMENT APPARATUS INCLUDING THE SAME

CROSS-REFERENCE TO RELATED APPLICATION

This application claims the priority benefit of Korean Patent Application No. 10-2015-0016101, filed on Feb. 2, 2015 in the Korean Intellectual Property Office, the disclosure of which is incorporated herein by reference.

BACKGROUND

1. Field

The present disclosure relates to a motor driving device and a laundry treatment apparatus.

2. Background

A motor driving device converts power applied thereto and drives a motor with the converted power. Home appliances include a motor driven by an AC voltage converted from a DC voltage. When the motor is driven, noise may be generated in a specific frequency band. In particular, noise may be generated at a specific frequency in a laundry treatment apparatus, refrigerator, vacuum cleaner, air conditioner and the like.

BRIEF DESCRIPTION OF THE DRAWINGS

The embodiments will be described in detail with reference to the following drawings in which like reference numerals refer to like elements wherein:

FIGS. 3A to 5B are diagrams for explaining operation of the inverter controller shown in FIG. 2;

DETAILED DESCRIPTION

Figure 1:
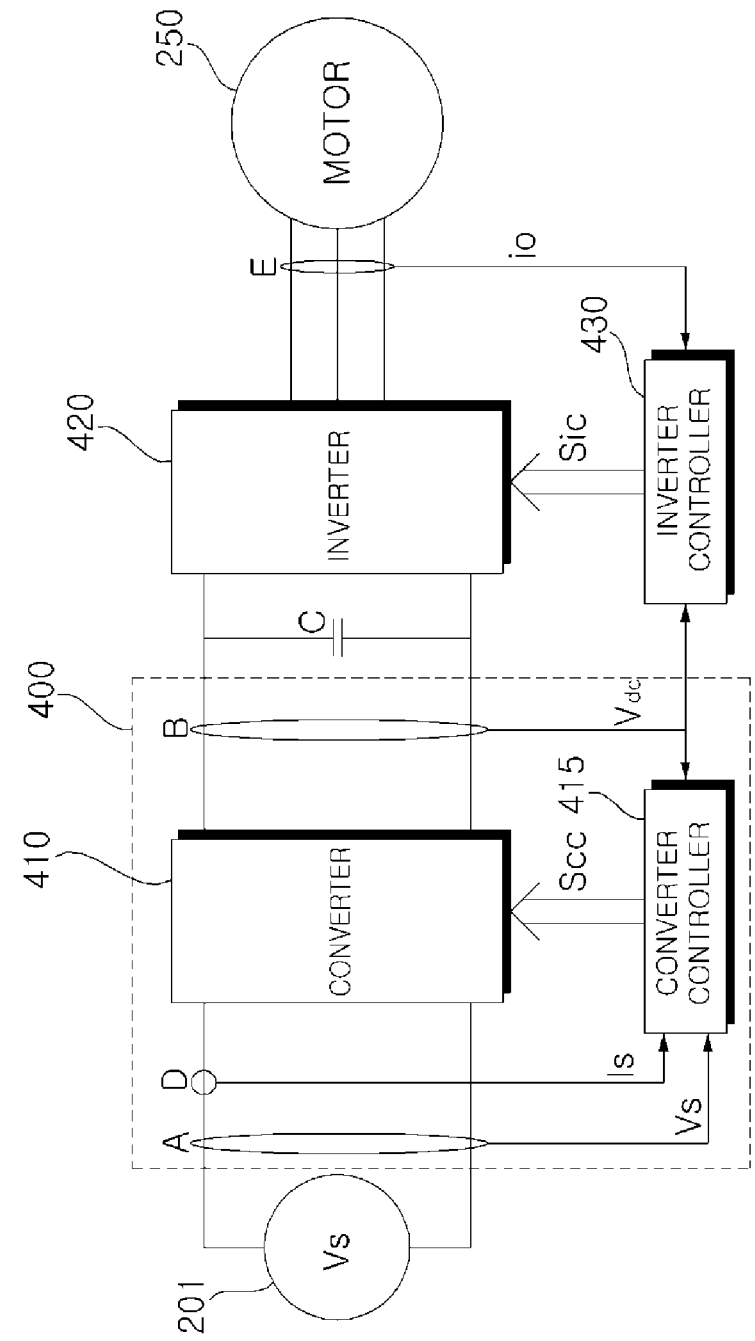
FIG. 1 is a circuit diagram of a motor driving device according to an embodiment of the present disclosure.

The motor driving device 200 illustrated in FIG. 1 changes a carrier frequency, changes a voltage command based on the changed carrier frequency and drives a motor based on the changed carrier frequency and voltage command so as to reduce noise during operation of the motor. The motor driving device 200 may reduce noise during operation of the motor by gradually changing the carrier frequency in the range of a first frequency to a second frequency. The motor driving device 200 may be called a motor driver. The motor driving device 200 may include a converter 410, a converter controller 415, a capacitor C, an inverter 420 and an inverter controller 430. The motor driving device 200 may further include an input current detector A, a DC terminal voltage detector B and an output current detector E.

The input current detector A may detect an input current Is input from a commercial AC power supply 201. A current transformer (CT), a shunt resistor and the like may be used as the input current detector A. The detected input current Is is a discrete signal in a pulse form and may be applied to the inverter controller 430 for calculation of power consumption.

The converter 410 converts an AC voltage supplied from the commercial AC power supply 201 into a DC voltage and outputs the DC voltage. While the commercial AC power supply 201 is shown as a single-phase AC power supply in the figure, the commercial AC power supply may be a three-phase AC power supply. The internal configuration of the converter 410 depends on the type of the commercial AC power supply 201.

The converter 410 may be configured in the form of a diode without a switching element so as to perform a rectification operation without a switching operation. For example, four diodes in a bridge configuration may be used in the case of the single-phase AC power supply and six diodes in a bridge configuration may be used in the case of the three-phase AC power supply.

For example, a half bridge type converter, which is constructed in such a manner that two switching elements and four diodes are connected, may be used as the converter 410. In the case of the three-phase AC power supply, six switching elements and six diodes may be used.

The capacitor C for storing or smoothing the voltage converted by the converter 410 may be provided to the output terminal of the converter 410. Both terminals of the capacitor C may be referred to as DC terminals. Accordingly, the capacitor C may be referred to as a DC terminal capacitor.

The converter controller 415 may generate a converter switching control signal Scc based on an input voltage Vs, the input current Is and a DC terminal voltage Vdc and output the converter switching control signal Scc to the converter 410.

The DC terminal voltage detector B may detect the DC terminal voltage Vdc applied across both terminals of the smoothing capacitor C. The DC terminal voltage detector B may include a resistor, an amplifier and the like. The detected DC terminal voltage Vdc is a discrete signal in a pulse form and may be applied to the inverter controller 430.

The inverter 420 may drive the motor 250. The inverter 420 may include a plurality of inverter switching elements, convert a DC voltage Vdc smoothed by on/off operations of the switching elements into three-phase AC voltages Va, Vb and Vc at predetermined frequencies and output the three-phase AC voltages to a three-phase synchronous motor 250.

The inverter 420 is constructed in such a manner that serially connected upper switching elements Sa, Sb and Sc and serially connected lower switching elements S'a, S'b and S'c are respectively paired such that three pairs of switching elements Sa&S'a, Sb&S'b and Sc&S'c are connected in parallel. Diodes are connected in reverse parallel with the switching elements Sa, S'a, Sb, S'b, Sc and S'c.

The switching elements included in the inverter 420 are switched on/off based on an inverter switching control signal Sic from the inverter controller 430. The three-phase AC voltages having predetermined frequencies are output to the three-phase synchronous motor 250.

The inverter controller 430 may control switching operation of the inverter 420. The inverter controller 430 may receive an output current io detected by the output current detector E. The inverter controller 430 outputs the inverter switching control signal Sic to the inverter 420 in order to control switching operation of the inverter 420. The inverter switching control signal Sic is a pulse width modulation (PWM) switching control signal and is generated based on the output current io detected by the output current detector E. The operation of outputting the inverter switching control signal Sic in the inverter controller 430 will be described in detail hereinafter with reference to FIG. 7.

The output current detector E detects the output current io flowing between the inverter 420 and the three-phase synchronous motor 250. The output current detector E detects current flowing through the motor 250. The output current detector E may detect all output currents ia, ib and is of three phases or detect output currents of two phases using three phase equilibrium. The output current detector E may be provided between the inverter 420 and the motor 250, and a current transformer (CT), a shunt resistor and the like may be used as the output current detector E for current detection.

When the shunt resistor is used, three shunt resistors may be provided between the inverter 420 and the synchronous motor 250 or one terminal of each shunt resistor may be connected to each of the three lower switching elements S'a, S'b and S'c of the inverter 420. Two shunt resistors may be employed using three phase equilibrium. When one shunt resistor is used, the shunt resistor may be provided between the capacitor C and the inverter 420.

The detected output current io is a discrete signal in a pulse form and may be applied to the inverter controller 430. The inverter switching control signal Sic is generated based on the detected output current io. In the following description, the detected output current io is output currents ia, ib and is of three phases.

The motor 250 may be a three-phase motor. The motor 250 includes a stator and a rotor. An AC voltage of each phase at a predetermined frequency is applied to a coil of the stator of each phase a, b or c such that the rotor rotates.

For example, the motor 250 may include a surface-mounted permanent-magnet synchronous motor (SMPMSM), an interior permanent magnet synchronous motor (IPMSM), a synchronous reluctance motor (Synrm) and the like. The SMPMSM and IPMSM are permanent magnet synchronous motors (PMSMs) employing a permanent magnet and the Synrm has no permanent magnet.

The inverter controller 430 may change a carrier frequency, change a voltage command based on the changed carrier frequency and output the inverter switching control signal to the inverter based on the changed carrier frequency and voltage command.

The inverter controller 430 may change a carrier frequency of a triangular wave, change a peak level of the triangular wave and the voltage command based on the changed carrier frequency of the triangular wave and output the inverter switching control signal to the inverter based on the changed carrier frequency and voltage command.

The inverter controller 430 may gradually change the carrier frequency in the range of the first frequency to the second frequency. The inverter controller 430 may change the carrier frequency for a period in which the motor is aligned using predetermined power, change the voltage command based on the changed carrier frequency and output the inverter switching control signal to the inverter based on the changed carrier frequency and voltage command.

Figure 2:
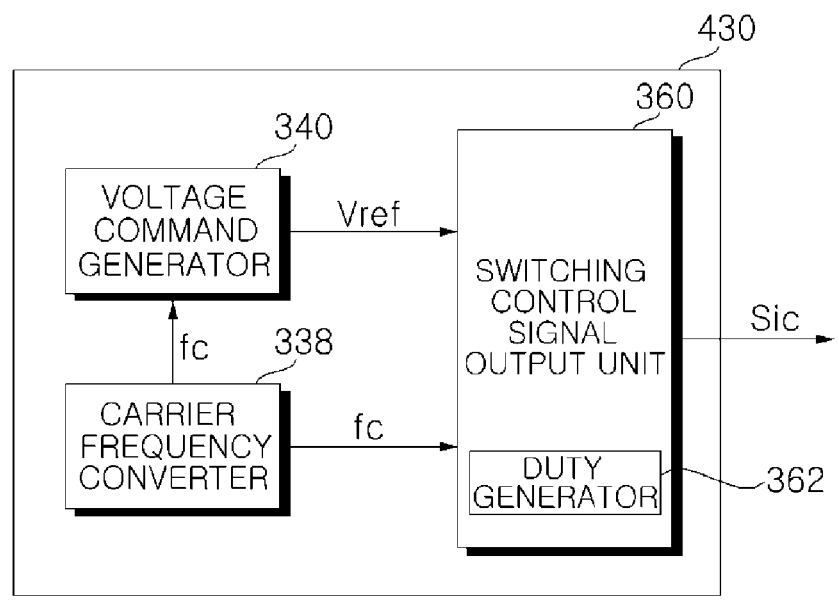
FIG. 2 is a block diagram illustrating an exemplary configuration of an inverter controller shown in FIG. 1.

Referring to FIG. 2, the inverter controller 430 may include a frequency converter 338, a voltage command generator 340 and a switching control signal output unit 360.

The frequency converter 338 may change a carrier frequency. For example, the frequency converter 338 can change a carrier frequency of 16 KHz to a frequency in the range of 13 Khz to 16 KHz. The frequency converter 338 may gradually change the carrier frequency in the range of the first frequency to the second frequency. The frequency converter 338 may output the carrier frequency Fc to the voltage command generator 340 and the switching control signal output unit 360. The frequency converter 338 may change a carrier frequency and a peak level of a triangular wave.

The voltage command generator 340 may change a voltage command Vref based on variation of the carrier frequency fc. The switching control signal output unit 360 may output the inverter switching control signal Sic to the inverter 420 based on the changed carrier frequency fc and voltage command Vref. The switching control signal output unit 360 may include a duty generator 362 that generates a duty based on the changed carrier frequency fc and voltage command Vref.

Figure 3A:
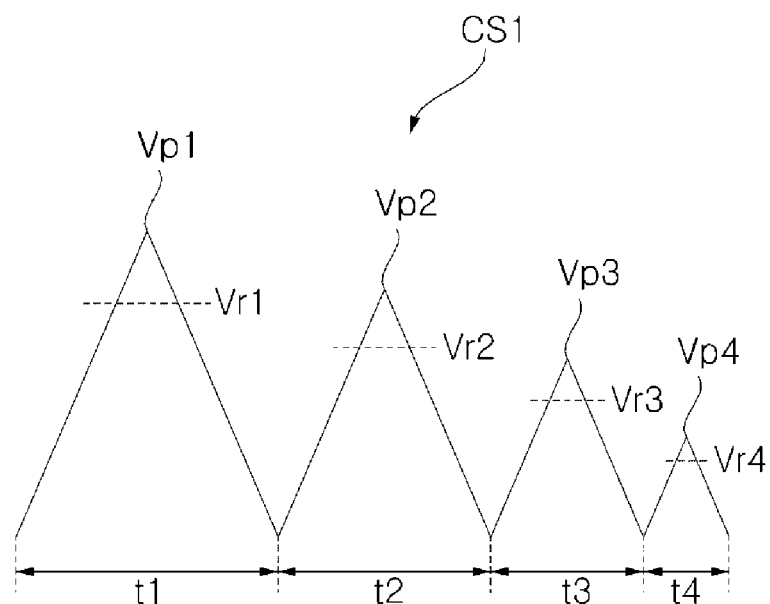

FIG. 3A shows a variation in a frequency of a carrier CS1 in the form of a triangular wave. Particularly, FIG. 3a shows gradual increase of the carrier frequency. The peak level of the triangular wave is Vp1 in a period t1, Vp2 in a period t2, Vp3 in a period t3 and Vp4 in a period t4. Further, t1>t2>t3>t4 and Vp1>Vp2>Vp3>Vp4.

The inverter controller 430 may change the carrier frequency of the triangular wave, change the peak level of the triangular wave and the voltage command based on the changed carrier frequency of the triangular wave and output the inverter switching control signal to the inverter based on the changed carrier frequency and voltage command. The voltage command generator 340 may change the voltage command in response to the peak level of the triangular wave. In FIG. 3A, Vr1, Vr2, Vr3 and Vr4 are set corresponding to Vp1, Vp2, Vp3 and Vp4, respectively, wherein Vr1>Vr2>Vr3>Vr4.

Figure 3B:
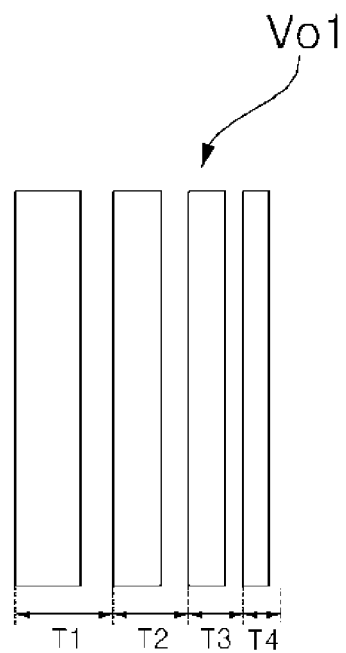

FIG. 3B shows an output voltage Vo1 output to the motor 250 based on the carrier and voltage command shown in FIG. 3A. Periods T1, T2, T3 and T4 of the output voltage Vo1 respectively correspond to t1, t2, t3 and t4 shown in FIG. 3A. As the switching frequency of the carrier increases and the switching period decreases, the period in which the output voltage is applied to the motor decreases.

Figure 3C:
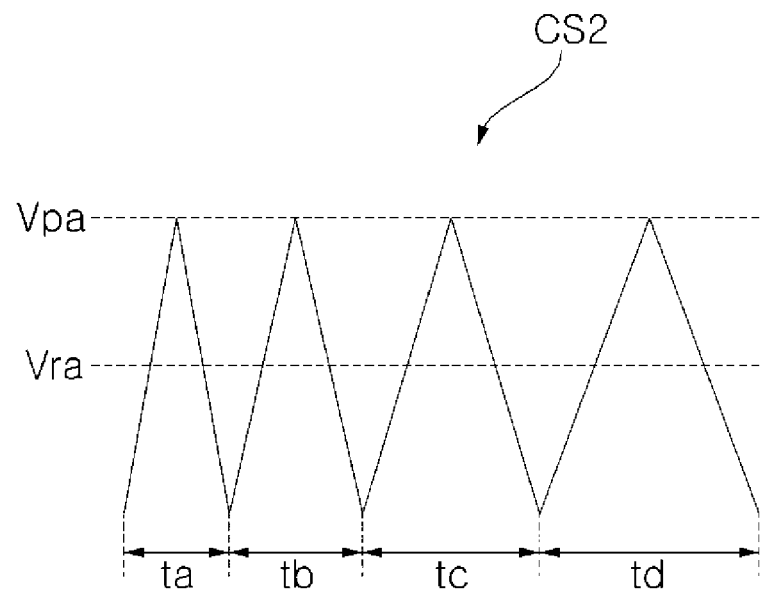

FIG. 3C shows a variation in a frequency of a carrier CS2 in the form of a triangular wave. Particularly, FIG. 3c shows gradual decrease of the carrier frequency. The peak level of the triangular wave is uniform for periods ta, tb, tc and td. Here, ta<tb<tc<td.

Figure 3D:
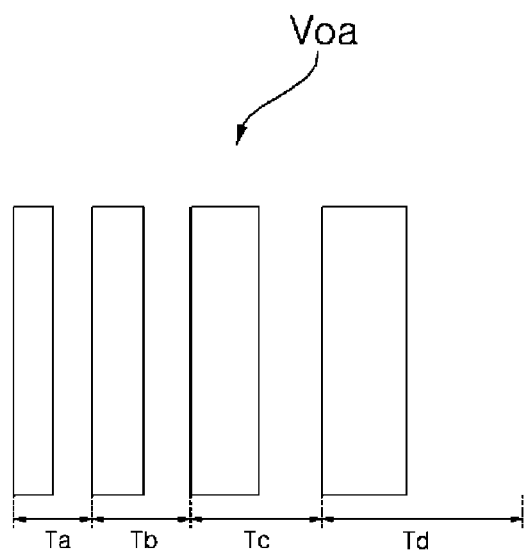

FIG. 3D shows an output voltage Voa output to the motor 250 based on the carrier and voltage command shown in FIG. 3C. Referring to FIGS. 3C and 3D, even if the frequency of the carrier CS2 is changed, it is difficult to output a desired output voltage since the voltage command is constant. Furthermore, since only the frequency of the carrier CS2 is changed and the peak level of the carrier CS2 is constant, it is not easy to output a desired output voltage.

Referring to FIGS. 3A and 3B, however, the frequency of the carrier CS1 in the form of a triangular waveform is changed and the voltage command is changed in response to carrier frequency variation. Further, the voltage command is changed in response to variation of the peak level of the carrier CS1 in the form of a triangular waveform. Accordingly, the voltage command is changed in response to increase or decrease of the switching frequency and thus output voltages in the same form can be obtained. Therefore, error in output voltages can be reduced. Since the inverter controller 430, which is a single module, includes the frequency converter 338, the voltage command generator 340 and the switching control signal output unit 360, accurate control can be achieved.

Figure 4:
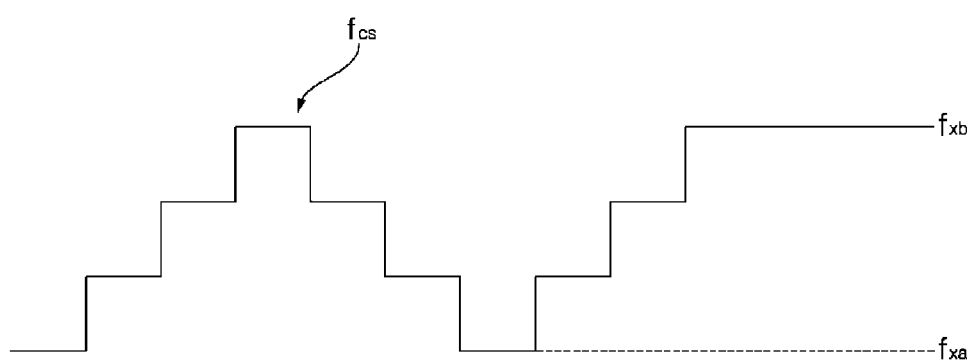

FIG. 4 shows gradual variation in a carrier frequency between the first frequency and the second frequency. The inverter controller 430 may gradually change the carrier frequency in the range of the first frequency to the second frequency. For example, the inverter controller 430 can increase the frequency fcs of the carrier from the first frequency fxa to the second frequency fxb in stages and then decrease the frequency fcs from the second frequency fxb to the first frequency fxa in stages. The first frequency fxa may be 13 KHz and the second frequency fxb may be 16 KHz.

Noise generated when the motor is driven can be reduced by gradually changing the carrier frequency in the range of the first frequency to the second frequency, as described above. Particularly, noise in an audible frequency band, generated when the motor is driven, can be decreased.

Figure 5B:
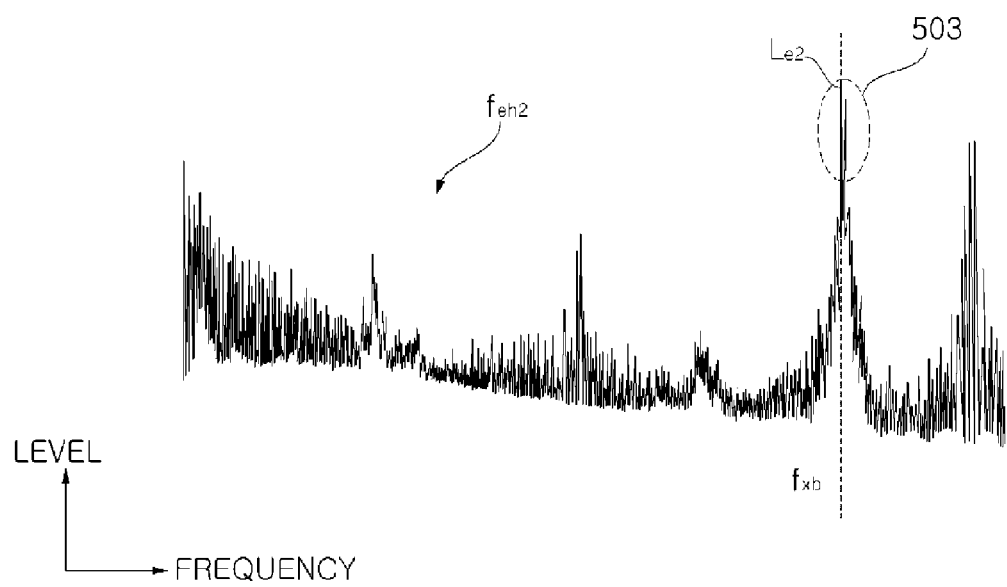

A frequency spectrum feh1 as shown in FIG. 5A can be obtained according to the aforementioned frequency variation. Frequency levels in a frequency band 501 from 13 KHz to 16 KHz can be exemplified as Le1$a$ and Le1$b$. When a fixed switching frequency fxb is used, a frequency spectrum feh2 as shown in FIG. 5B can be obtained. The fixed switching frequency fxb may be 16 KHz. Referring to FIG. 5B, a frequency level in a frequency band 503 of 16 KHz may be exemplified as Le2.

Comparing FIG. 5A with FIG. 5B, the frequency levels Le1$a$ and Le1$b$ in the frequency band 501 in the range of 13 KHz to 16 KHz are considerably lower than the frequency level Le2 in the frequency band 503 of 16 KHz. In other words, the carrier frequency is gradually changed between the first frequency and the second frequency and thus a frequency level at a specific frequency decreases. That is, noise at the specific frequency can be reduced.

Figure 6:
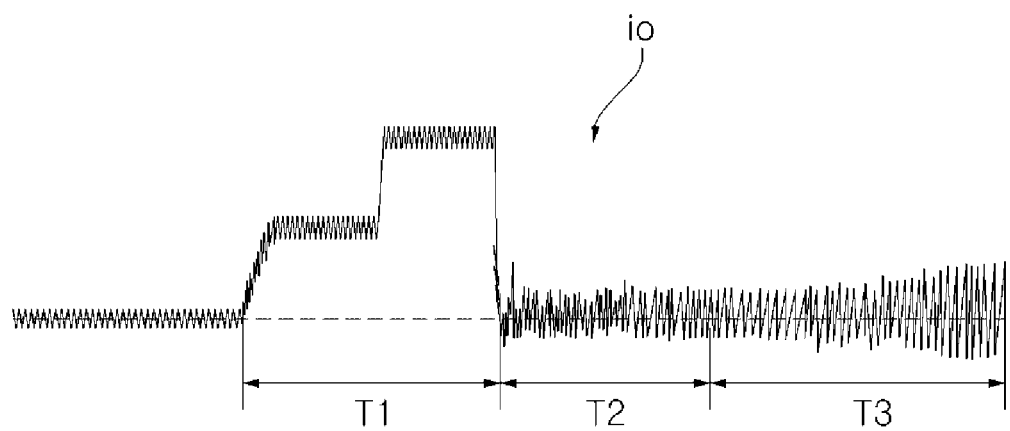
FIG. 6 shows an example of AC supplied to a motor shown in FIG. 1.

FIG. 6 shows an example of AC supplied to the motor of FIG. 1, and shows a current that flows through the motor 250 according to the switching operation of the inverter 420. Specifically, the operation period of the motor 250 can be divided into a start-up period T1 corresponding to an initial operation period, a forced acceleration period T2 and a normal operation period T3.

The start-up period T1 may be called a motor alignment period in which a predetermined current is applied to the motor 250. To align the stopped rotor of the motor 250 to a predetermined position, one of the three upper switching elements of the inverter 420 may be switched on and two lower switching elements, which are not paired with the switched-on upper switching element, can be switched on. The inverter controller 430 may control a current of a first level and a current of a second level to be sequentially applied to the motor for the start-up period T1.

For the forced acceleration period T2 following the start-up period T1, a motor speed may increase. The normal operation period T3 following the forced acceleration period T2 may correspond to a period in which the position of the rotor is estimated based on the output current detected by the output current detector E and the motor speed is changed based on the estimated rotor position.

Carrier frequency variation described in FIGS. 1 to 5 is applicable to the start-up period T1, forced acceleration period T2 and normal operation period T3. In particular, carrier frequency variation can be applied to the start-up period T1 in which a predetermined current is applied to the motor 250 to reduce noise generated in the start-up period T1.

Figure 7:
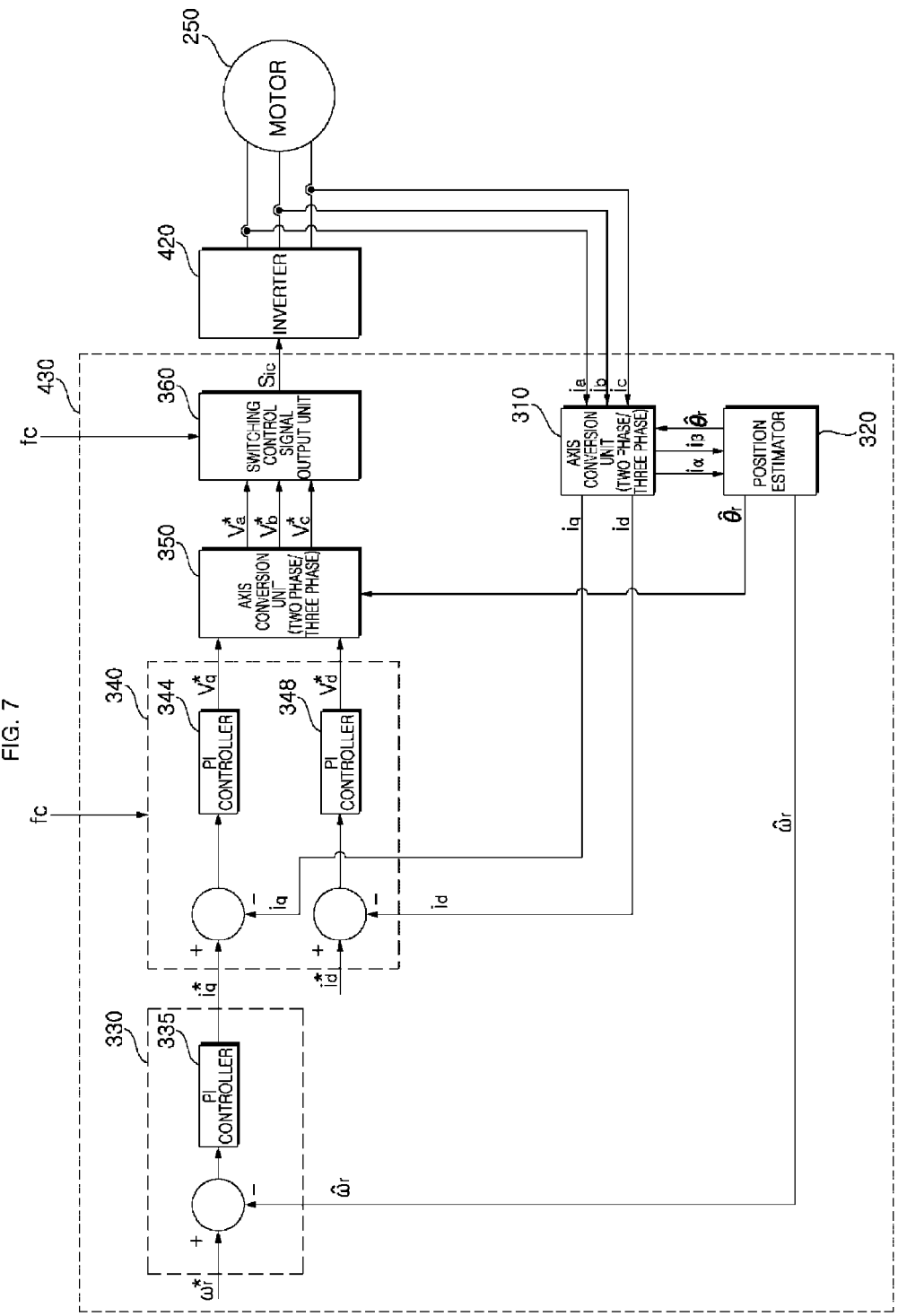
FIG. 7 is a block diagram illustrating another exemplary configuration of the inverter controller of FIG. 1.

FIG. 7 is a block diagram illustrating another exemplary configuration of the inverter controller of FIG. 1. The inverter controller 430 may include an axis conversion unit 310, a position estimator 320, a current reference generator 330, the voltage command generator 340, an axis conversion unit 350 and the switching control signal output unit 360.

The axis conversion unit 310 receives the output currents ia, ib and ic of three phases, detected by the output current detector E and converts the output currents ia, ib and ic of three phases into two-phase currents i$\alpha$ and i$\beta$ in a rest frame. The axis conversion unit 310 can convert the two-phase currents i$\alpha$ and i$\beta$ in the rest frame into two-phase currents id and ig in a rotating reference frame.

The position estimator 320 can estimate a rotor position $\hat{\theta}_r$ of the motor 250 based on the two-phase currents id and ig in the rotating reference frame, converted by the axis conversion unit 310. In addition, the position estimator 320 may estimate a speed $\hat{\omega}_r$ based on the rotor position $\hat{\theta}_r$. Consequently, the position estimator 320 can output the calculated position $\hat{\theta}_r$ and calculated speed $\hat{\omega}_r$ based on the three-phase output currents ia, ib and ic detected by the output current detector E.

The current reference generator 330 calculates a speed command $\omega^*r$ based on the calculated speed $\hat{\omega}_r$ and a target speed w and generate a current command i*q based on the speed command $\omega^*r$. For example, the current reference generator 330 can perform PI control in a PI controller 335 based on the speed command $\omega^*r$ that is a difference between the calculated speed $\hat{\omega}_r$ and the target speed $\omega$ and generate the current command i*q.

While the q-axis current command i*q is exemplified as the current command in FIG. 7, a d-axis current command i*d may be generated along with the q-axis current command i*q. The d-axis current command i*d may be set to 0. The current reference generator 330 may further include a limiter that limits the level of the current command i*q such that the level does not exceed an allowable range.

The voltage command generator 340 generates d-axis and q-axis voltage commands v*d and v*q based on the d-axis and q-axis currents id and iq, which are transformed into the two-phase rotating reference frame by the axis conversion unit, and the current commands i*d and i*q generated by the current reference generator 330. For example, the voltage command generator 340 can perform PI control in the PI controller 344 based on a difference between the q-axis current iq and the q-axis current command i*q and generate the q-axis voltage command v*q.

In addition, the voltage command generator 340 can perform PI control in the PI controller 348 based on a difference between the d-axis current id and the d-axis current command i*d and generate the d-axis voltage command v*d. The d-axis voltage command v*d may be set to 0 when the d-axis current command i*d is set to 0. The voltage command generator 340 may further include a limiter that limits the levels of the d-axis and a-axis voltage commands v*d and v*q such that the levels do not exceed allowable ranges. The generated d-axis and q-axis voltage commands v*d and v*q are applied to the axis conversion unit 350.

The axis conversion unit 350 receives the position $\hat{\theta}_r$ calculated in the position estimator 320 and the d-axis and q-axis voltage commands v*d and v*q and performs axis transformation. The axis conversion unit 350 transforms the two-phase rotating reference frame into a two-phase rest frame. Here, the position $\hat{\theta}_r$ calculated in the position estimator 320 can be used. In addition, the axis conversion unit 350 transforms the two-phase rest frame into a three-phase rest frame. The axis conversion unit 350 outputs three-phase output voltage commands v*a, v*b and v*c through transformation.

The switching control signal output unit 360 generates the PWM inverter switching control signal Sic based on the three-phase output voltage commands v*a, v*b and v*c. The inverter switching control signal Sic output from the switching control signal output unit 360 can be converted into a gate driving signal in a gate driver and applied to a gate of each switching element included in the inverter 420. Accordingly, the switching elements Sa, S'a, Sb, S'b, Sc and S'c in the inverter 420 perform switching operations.

As described above with reference to FIG. 2, the voltage command generator 340 can receive information on the changed carrier frequency fc from the frequency converter 338. In addition, the voltage command generator 340 can change the voltage command Vref based on the changed carrier frequency fc. The voltage command Vref shown in FIG. 2 can correspond to the d-axis and q-axis voltage commands v*d and v*q.

The switching control signal output unit 360 can receive information on the changed carrier frequency fc from the frequency converter 338, as described above with reference to FIG. 2. The switching control signal output unit 360 can output the inverter switching control signal Sic to the inverter 420 based on the changed carrier frequency fc and the voltage command Vref. The switching control signal output unit 360 can generate a duty based on the changed carrier frequency fc and the voltage command Vref and output the inverter switching control signal Sic based on the generated duty.

Figure 8:
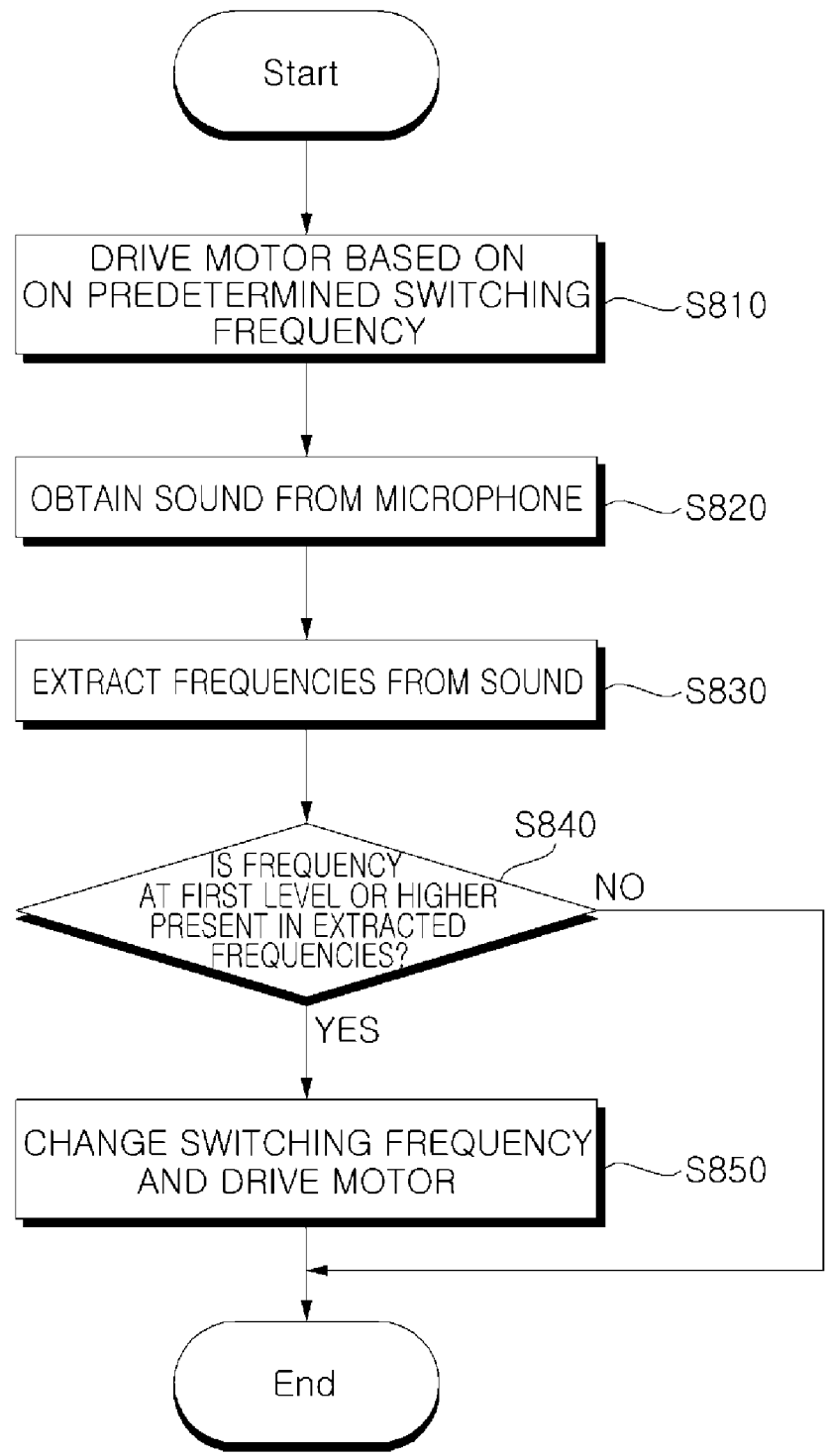
FIG. 8 is a flowchart illustrating a method for operating the motor driving device according to an embodiment of the present disclosure.

Referring to FIG. 8, the motor driving device 200 drives the motor based on a predetermined switching frequency (S810). The motor driving device 200 collects sound around the motor through a microphone (S820). The microphone can transmit collected sound signals to the inverter controller 430. The motor driving device 200 can extract frequencies from the collected sound signals (S830).

The motor driving device 200 determines whether the extracted frequencies include a frequency at a first level or higher (S840), and changes the switching frequency and drives the motor when the extracted frequencies include a frequency at the first level or higher (S850). In other words, the motor driving device 200 changes the switching frequency in order to reduce a level of a frequency region corresponding to the first level or higher in the corresponding frequency spectrum. Then, the motor driving device 200 can drive the motor by outputting the inverter switching control signal based on the changed switching frequency.

Figure 9:
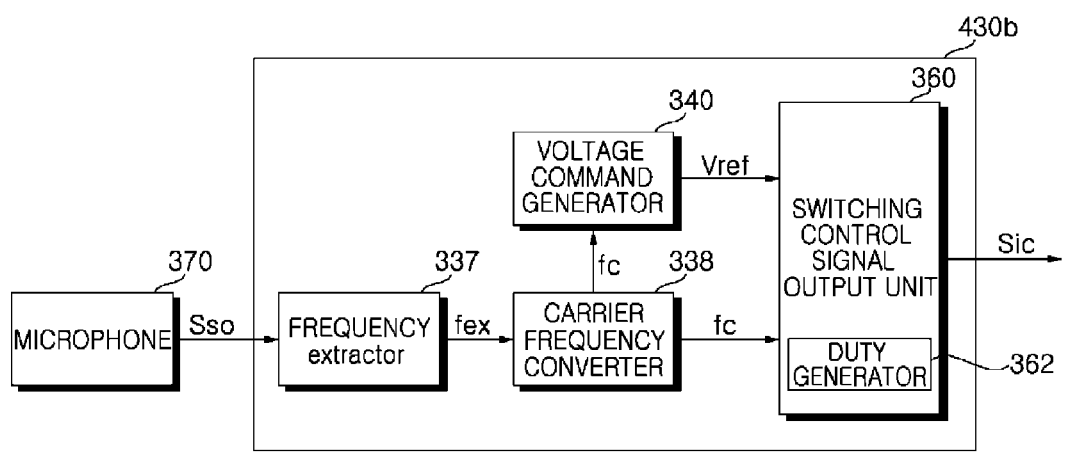
FIG. 9 is a block diagram illustrating another exemplary configuration of the inverter controller of FIG. 1.

FIG. 9 is a block diagram illustrating another exemplary configuration of the inverter controller of FIG. 1.

Referring to FIG. 9, the inverter controller 430b is similar to the inverter controller 430 shown in FIG. 2 but differs from the inverter controller 430 in that the inverter controller 430b further includes a frequency extractor 337. A microphone 370 collects sound around the motor 250. Sound signals Sso collected by the microphone 370 can be transmitted to the frequency extractor 337 included in the inverter controller 430b.

The frequency extractor 337 can receive the sound signals Sso from the microphone 370 and extract frequencies of the received sound signals Sso. For example, frequencies corresponding to the frequency spectrum as shown in FIG. 5b and frequency levels corresponding to the frequencies can be extracted.

The carrier frequency converter 338 can change a carrier frequency based on a peak level of the extracted frequencies. For example, when the level of the second frequency fxb of FIG. 5b is higher than the first level, the carrier frequency converter 338 can control the carrier frequency to change between the first frequency fxa and the second frequency fxb, as shown in FIG. 5A. Accordingly, the frequency peak level decreases and thus noise during operation of the motor is reduced. Particularly, noise can be actively reduced based on the sound signals collected through the microphone 370.

The motor driving device 200 described with reference to FIGS. 1 to 9 is applicable to various electronic devices. For example, the motor driving device 200 can be applied to a laundry treatment apparatus (washing machine and spin dryer), a refrigerator, an air conditioner, a vacuum cleaner and the like.

Figure 10:
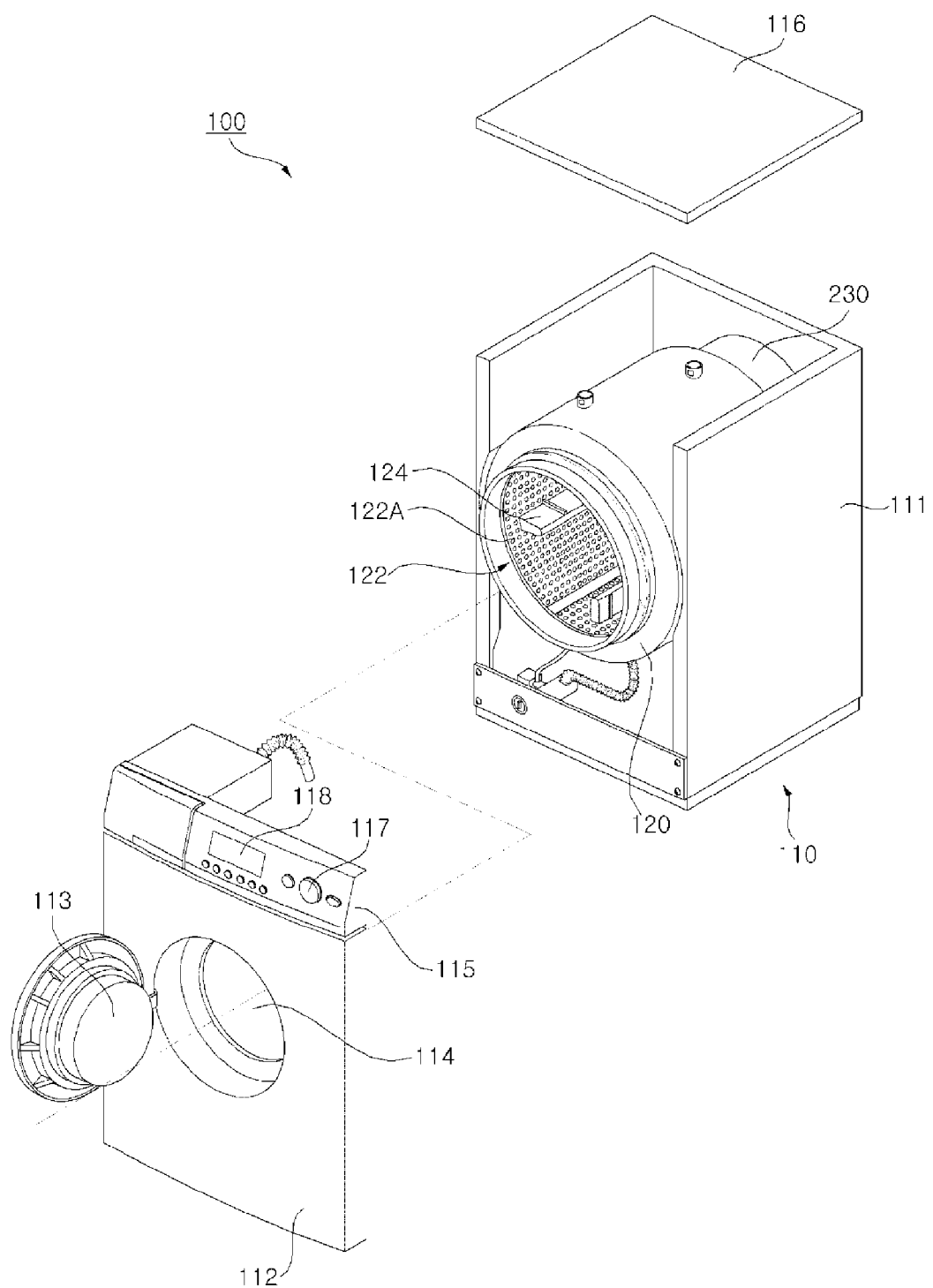
FIG. 10 is a perspective view of a laundry treatment apparatus according to an embodiment of the present disclosure.

FIG. 10 illustrates a laundry treatment apparatus 100 employing the motor driving device 200 according to an embodiment of the present disclosure. The laundry treatment apparatus 100 is a drum type laundry treatment machine and includes a cabinet 110 that forms the exterior of the laundry treatment apparatus 100, a tub 120 located inside the cabinet 110 and supported by the cabinet 110, a drum 122 provided to the inside of the tub 120, in which clothing is washed, a motor 130 for driving the drum 122, a washing water supply unit provided outside the cabinet body 111 and supplying washing water to the inside of the cabinet 110, and a drainage unit provided under the tub 120 and discharging washing water to the outside.

The drum 122 has a plurality of through-holes 122A through which washing water passes. A lifter 124 may be provided to the inner side of the drum 122 such that laundry is lifted to a predetermined height when the drum 1223 rotates and then dropped according to gravity.

The cabinet 110 includes the cabinet body 111, a cabinet cover 112 provided to the front of the cabinet body 111 and combined with the cabinet body 111, a control panel 115 provided to the upper side of the cabinet cover 112 and combined with the cabinet body 111, and a top plate 116 provided to the top of the control panel 115 and combined with the cabinet body 111. The cabinet cover 112 includes a cloth entrance hole 114 through which cloth is loaded/unloaded into/from the tub 120, and a door 113 provided to be rotatable to the left and right such that the cloth entrance hole 114 can be open and closed.

The control panel 115 includes operation keys 117 for controlling an operation state of the laundry treatment apparatus 100 and a display 118 provided to one side of the operation keys 117 and displaying an operation state of the laundry treatment apparatus 100. The operation keys 117 and the display 118 are electrically connected to a controller and the controller electrically controls components of the laundry treatment apparatus.

The drum 122 may include an auto-balance. The auto-balance reduces vibration generated according to eccentricity of laundry in the drum 122 and may be implemented by a liquid balance, a ball balance and the like. The laundry treatment apparatus 100 may further include a vibration sensor for measuring vibration of the drum 122 or the cabinet 110.

Figure 11:
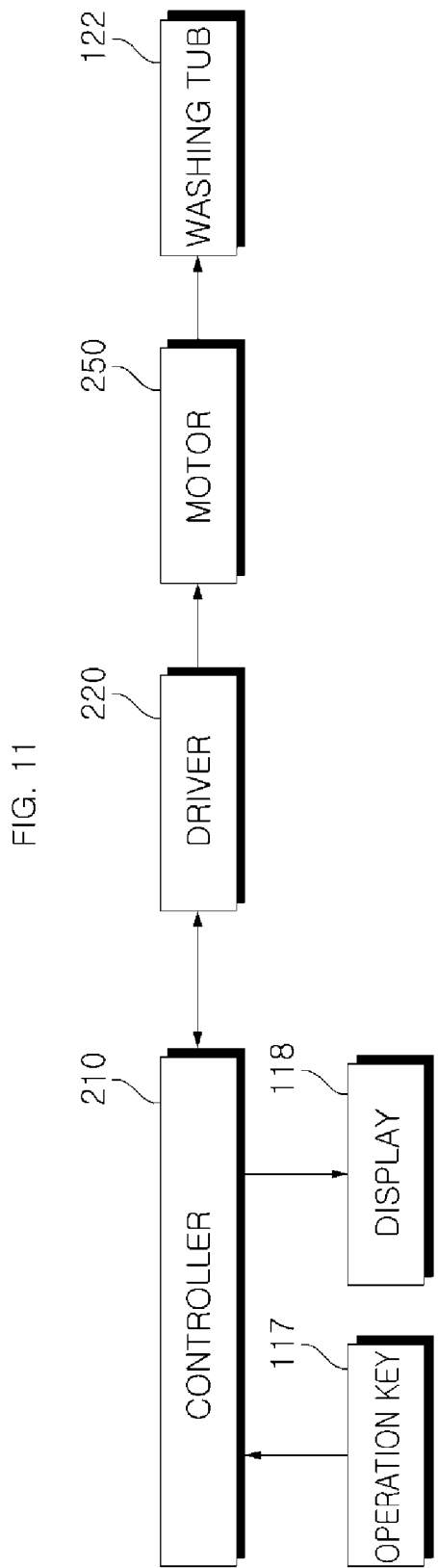
FIG. 11 is a block diagram of the laundry treatment apparatus shown in FIG. 10.

FIG. 11 is a block diagram of the laundry treatment apparatus shown in FIG. 10. In the laundry treatment apparatus 100, a driver 220 is controlled by a controller 210 and drives the motor 250. Accordingly, the motor 250 rotates the drum 122.

The controller 210 operates by receiving an operation signal from the operation keys 117. Accordingly, washing, rinsing and spin dry cycles may be performed. In addition, the controller 210 can control the display 118 to display a washing course, washing time, spin-drying time, rinsing time and the like or a current operation state.

The controller 210 controls the driver 220 to operate the motor 250. The motor 250 does not include a position sensor for sensing a rotor position of the motor. That is, the driver 220 controls the motor 250 sensorlessly. The driver 220 drives the motor 250. The driver 220 may correspond to the motor driving device 200 of FIG. 1. Accordingly, the driver 220 can include a converter, an inverter, an inverter controller and the like.

Operations of the driver 220 may correspond to the operations of the motor driving device 200 described above with reference to FIGS. 1 to 9. The controller 210 may sense the quantity of clothing based on current io flowing through the motor. For example, the controller 210 can sense the quantity of clothing based on the current io of the motor 250 while the drum 122 rotates.

In addition, the controller 210 may sense eccentricity of the drum 122, that is, unbalance (UB) of the drum 122. The controller 210 can sense eccentricity of the drum 122 based on a ripple component of the current io flowing through the motor or a rotating speed variation of the drum 122.

A motor driving device may reduce noise during operation of a motor and a laundry treatment apparatus including the same. A motor driving device may include: an inverter to convert DC power into AC power according to a switching operation and to output the converted AC power to a motor; an output current detector to detect an output current flowing through the motor; and a controller to control the inverter based on the detected output current, wherein the controller changes a carrier frequency, changes a voltage command based on the changed carrier frequency and outputs an inverter switching control signal to the inverter based on the changed carrier frequency and the changed voltage command.

A motor driving device may also include: an inverter to convert DC power into AC power according to a switching operation and to output the converted AC power to a motor; an output current detector to detect an output current flowing through the motor; and a controller to control the inverter based on the detected output current, wherein the controller gradually changes a carrier frequency in the range of a first frequency to a second frequency and outputs an inverter switching control signal to the inverter based on the changed carrier frequency.

A laundry treatment apparatus may include: a washing tub; a motor to rotate the washing tub; and a motor driver to drive the motor, wherein the motor driver includes: an inverter to convert DC power into AC power according to a switching operation and to output the converted AC power to the motor; an output current detector to detect an output current flowing through the motor; and a controller to control the inverter based on the detected output current, wherein the controller changes a carrier frequency, changes a voltage command based on the changed carrier frequency and outputs an inverter switching control signal to the inverter based on the changed carrier frequency and the changed voltage command.

The motor driving device and the laundry treatment apparatus including the same include the inverter for converting DC power into AC power according to a switching operation and outputting the converted AC power to a motor, the output current detector to detect an output current flowing through the motor and the controller for controlling the inverter based on the detected output current, wherein the controller changes a carrier frequency, changes a voltage command based on the changed carrier frequency and outputs an inverter switching control signal to the inverter based on the changed carrier frequency and the changed voltage command. Accordingly, noise can be reduced during operation of the motor.

It is possible to reduce noise during operation of the motor by gradually changing the carrier frequency in the range of the first frequency to the second frequency. It is possible to reduce noise in an audible frequency band during operation of the motor.

Meanwhile, a carrier frequency is changed and a voltage command is changed in response to carrier frequency variation. In addition, the voltage command is changed in response to variation of a peak value of a carrier CS1 in the form of a triangular wave. Accordingly, it is possible to obtain output voltages in the same form since the voltage command is changed in response to a switching frequency increase or decrease. Therefore, error in output voltages can be reduced.

According to another embodiment of the present disclosure, the motor driving device and the laundry treatment apparatus including the same may further include the microphone and can actively reduce noise generated when the motor is driven by changing a carrier frequency based on a frequency level of sound collected through the microphone.

Any reference in this specification to "one embodiment," "an embodiment," "example embodiment," etc., means that a particular feature, structure, or characteristic described in connection with the embodiment is included in at least one embodiment of the disclosure. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A motor driving device, comprising:
   an inverter to convert DC power into AC power according to a switching operation and to output the converted AC power to a motor;
   an output current detector to detect an output current flowing through the motor; and
   a controller configured to control the inverter based on the detected output current, wherein the controller changes a carrier frequency, changes a voltage command based on the changed carrier frequency and outputs an inverter switching control signal to the inverter based on the changed carrier frequency and the changed voltage command,
   wherein the inverter includes upper switching elements and lower switching elements that are respectively paired, and pairs of switching elements are connected in parallel, wherein during a start-up period of an operation period of the motor, one of the upper switching elements of the inverter is switched on and two lower switching elements, which are not paired with the switched-on upper switching element, are switched on for aligning the motor, wherein the controller is configured to control a current of a first level and a current of a second level to be sequentially applied to the motor during the start-up period, and wherein the controller changes the carrier frequency during the start-up period, changes the voltage command based on the changed carrier frequency and outputs the inverter switching control signal to the inverter based on the changed carrier frequency and the changed voltage command.

2. The motor driving device of claim 1, wherein the controller changes a carrier frequency of a triangular waveform, changes a peak level of the triangular waveform and the voltage command based on the changed carrier frequency of the triangular waveform and outputs the inverter switching control signal to the inverter based on the changed carrier frequency and the changed voltage command.

3. The motor driving device of claim 1, wherein the controller gradually changes the carrier frequency in the range of a first frequency to a second frequency.

4. The motor driving device of claim 1, wherein the controller comprises:
   a carrier frequency converter to change a carrier frequency;
   a voltage command generator to generate a voltage command based on the changed carrier frequency; and
   a switching control signal output unit to output an inverter switching control signal to the inverter based on the changed carrier frequency and the changed voltage command.

5. The motor driving device of claim 4, wherein the controller further comprises:
   an estimator to estimate a rotor position of the motor based on the detected output current and to calculate a rotor speed; and
   a current reference generator to generate a current command based on the calculated rotor speed and a speed command,
   wherein the voltage command generator generates the voltage command based on the changed carrier frequency, the current command and the detected output current,
   wherein the switching control signal output unit outputs the inverter switching control signal for driving the inverter based on the voltage command.

6. The motor driving device of claim 4, wherein the switching control signal output unit includes a duty generator to generate a duty based on the changed carrier frequency and the changed voltage command.

7. The motor driving device of claim 1, further comprising a microphone to collect sound around the motor,
   wherein the controller includes:
      a frequency extractor to receive collected sound signals from the microphone and to extract frequencies of the received sound signals;
      a carrier frequency converter to change a carrier frequency based on a peak level of the extracted frequencies;
      a voltage command generator to generate a voltage command based on the changed carrier frequency; and
      a switching control signal output unit to output an inverter switching control signal to the inverter based on the changed carrier frequency and the changed voltage command.

8. The motor driving device of claim 7, wherein the carrier frequency converter changes the carrier frequency based on a frequency at a first level or higher from among the extracted frequencies.

9. A motor driving device, comprising:
   an inverter to convert DC power into AC power according to a switching operation and to output the converted AC power to a motor;
   an output current detector to detect an output current flowing through the motor; and
   a controller is configured to control the inverter based on the detected output current, wherein the controller gradually changes a carrier frequency in a range of a first frequency to a second frequency and outputs an inverter switching control signal to the inverter based on the changed carrier frequency,
   wherein the inverter includes upper switching elements and lower switching elements that are respectively paired, and pairs of switching elements are connected in parallel,
   wherein during a start-up period of an operation period of the motor, one of the upper switching elements of the inverter is switched on and two lower switching elements, which are not paired with the switched-on upper switching element, are switched on for aligning the motor,
   wherein the controller is configured to control a current of a first level and a current of a second level to be sequentially applied to the motor during the start-up period, and
   wherein the controller is configured to gradually changes the carrier frequency in the range of the first frequency to the second frequency during the start-up period, changes a voltage command based on the changed carrier frequency and outputs the inverter switching control signal to the inverter based on the changed carrier frequency and the changed voltage command.

10. A laundry treatment apparatus, comprising:
    a washing tub;
    a motor to rotate the washing tub; and
    a motor driver to drive the motor,
    wherein the motor driver includes:
       an inverter to convert DC power into AC power according to a switching operation and to output the converted AC power to the motor,
       an output current detector to detect an output current flowing through the motor, and
       a controller is configured to control the inverter based on the detected output current, wherein the controller changes a carrier frequency, changes a voltage command based on the changed carrier frequency and outputs an inverter switching control signal to the inverter based on the changed carrier frequency and the changed voltage command,
    wherein the inverter includes upper switching elements and lower switching elements that are respectively paired, and pairs of switching elements are connected in parallel,
    wherein during a start-up period of an operation period of the motor, one of the upper switching elements of the inverter is switched on and two lower switching elements, which are not paired with the switched-on upper switching element, are switched on for aligning the motor, wherein the controller is configured to control a current of a first level and a current of a second level to be sequentially applied to the motor during the start-up period, and wherein the controller is configured to change the carrier frequency during the start-up period, changes the voltage command based on the changed carrier frequency and outputs the inverter switching control signal to the inverter based on the changed carrier frequency and the changed voltage command.

11. The laundry treatment apparatus of claim 10, wherein the controller changes a carrier frequency of a triangular waveform, changes a peak level of the triangular waveform and the voltage command based on the changed carrier frequency of the triangular waveform and outputs the inverter switching control signal to the inverter based on the changed carrier frequency and the changed voltage command.

12. The laundry treatment apparatus of claim 10, wherein the controller gradually changes the carrier frequency in the range of a first frequency to a second frequency.

13. The laundry treatment apparatus of claim 10, wherein the controller comprises:
a carrier frequency converter to change a carrier frequency;
a voltage command generator to generate a voltage command based on the changed carrier frequency; and
a switching control signal output unit to output an inverter switching control signal to the inverter based on the changed carrier frequency and the changed voltage command.

14. The laundry treatment apparatus of claim 13, wherein the controller further comprises:
an estimator to estimate a rotor position of the motor based on the detected output current and to calculate a rotor speed; and
a current reference generator to generate a current command based on the calculated rotor speed and a speed command,
wherein the voltage command generator generates the voltage command based on the changed carrier frequency, the current command and the detected output current,
wherein the switching control signal output unit outputs the inverter switching control signal for driving the inverter based on the voltage command.

15. The laundry treatment apparatus of claim 13, wherein the switching control signal output unit includes a duty generator to generate a duty based on the changed carrier frequency and the changed voltage command.

16. The laundry treatment apparatus of claim 10, wherein the motor driver further includes a microphone to collect sound around the motor,
wherein the controller includes:
a frequency extractor to receive collected sound signals from the microphone and to extract frequencies of the received sound signals,
a carrier frequency converter to change a carrier frequency based on a peak level of the extracted frequencies,
a voltage command generator to generate a voltage command based on the changed carrier frequency, and
a switching control signal output unit to output an inverter switching control signal to the inverter based on the changed carrier frequency and the changed voltage command.

17. The laundry treatment apparatus of claim 16, wherein the carrier frequency converter changes the carrier frequency based on a frequency at a first level or higher from among the extracted frequencies.

\* \* \* \* \*